(12) United States Patent
Saito (10) Patent No.: US 10,248,204 B2
(45) Date of Patent: Apr. 2, 2019

(54) TACTILE STIMULUS CONTROL APPARATUS, TACTILE STIMULUS CONTROL METHOD, AND STORAGE MEDIUM

(71) Applicant: CANON KABUSHIKI KAISHA, Tokyo (JP)

(72) Inventor: Kyota Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/675,429

(22) Filed: Mar. 31, 2015

(65) Prior Publication Data

US 2015/0277564 A1    Oct. 1, 2015

(30) Foreign Application Priority Data

Apr. 1, 2014  (JP) ................................. 2014-075748

(51) Int. Cl.
*G06F 3/01*      (2006.01)
*G06F 3/0485*    (2013.01)

(52) U.S. Cl.
CPC ............ *G06F 3/016* (2013.01); *G06F 3/0485* (2013.01)

(58) Field of Classification Search
CPC ................................. G06F 3/016; G06F 3/0485
See application file for complete search history.

(56) References Cited

U.S. PATENT DOCUMENTS

| 2009/0231271 | A1 | 9/2009 | Heubel | |
|---|---|---|---|---|
| 2009/0292990 | A1* | 11/2009 | Park ........................ | G06F 3/016 715/702 |
| 2009/0322695 | A1* | 12/2009 | Cho ...................... | G06F 3/0416 345/173 |
| 2010/0125786 | A1* | 5/2010 | Ozawa ................ | G06F 3/04845 715/702 |
| 2011/0157052 | A1* | 6/2011 | Lee ........................ | G06F 1/1626 345/173 |

(Continued)

FOREIGN PATENT DOCUMENTS

| CN | 1695105 A | 11/2005 |
|---|---|---|
| CN | 101424997 A | 5/2009 |

(Continued)

*Primary Examiner* — Omar Abdul-Ali
(74) *Attorney, Agent, or Firm* — Canon U.S.A., Inc. IP Division (57) ABSTRACT

To provide the user with the relationship between the scrolling speed in scroll-displaying and an operation performed on an input surface, a tactile stimulus control apparatus includes an intensity determination unit and a tactile stimulus control unit. In a case where an operation performed by a manipulator on the input surface provided corresponding to a display unit is detected while an image is scroll-displayed by the display unit, the intensity determination unit determines the intensity of a tactile stimulus to be provided to the manipulator based on the scrolling speed at the timing of detection of the operation. The tactile stimulus control unit controls a tactile stimulus generating unit, which is configured to generate the tactile stimulus to be provided to the manipulator, to generate the tactile stimulus with the intensity determined by the intensity determination unit.

12 Claims, 4 Drawing Sheets

(56) References Cited

U.S. PATENT DOCUMENTS

| | | | |
|---|---|---|---|
| 2011/0163978 A1* | 7/2011 | Park | G06F 3/016 345/173 |
| 2011/0225492 A1* | 9/2011 | Boettcher | G06F 3/0485 715/702 |
| 2012/0098868 A1* | 4/2012 | Nagasaka | G06F 3/04883 345/684 |
| 2013/0113715 A1* | 5/2013 | Grant | G06F 3/0488 345/173 |
| 2014/0149922 A1* | 5/2014 | Hauser | G06F 3/0485 715/784 |
| 2014/0208260 A1* | 7/2014 | Kawahara | G06F 3/04845 715/784 |

FOREIGN PATENT DOCUMENTS

| | | | | |
|---|---|---|---|---|
| CN | 102681750 A | | 9/2012 | |
| CN | 103092406 A | | 5/2013 | |
| JP | H05-100809 A | | 4/1993 | |
| JP | 2011-517810 A | | 6/2011 | |
| JP | 2012-234569 A | | 11/2012 | |
| JP | 2013-003718 A | | 1/2013 | |
| JP | 2013-025594 | * | 2/2013 | G06F 3/0488 |
| JP | 2013-025594 A | | 2/2013 | |
| JP | 2013-168088 A | | 8/2013 | |
| KR | 10-2010-0124324 A | | 11/2010 | |
| KR | 10-2012-0137753 A | | 12/2012 | |
| KR | 10-2013-0050251 A | | 5/2013 | |
| WO | 2013/114844 A1 | | 8/2013 | |

* cited by examiner

TACTILE STIMULUS CONTROL APPARATUS, TACTILE STIMULUS CONTROL METHOD, AND STORAGE MEDIUM

BACKGROUND OF THE INVENTION

Field of the Invention

The present disclosure generally relates to stimulus control and, more particularly, to a tactile stimulus control apparatus, a tactile stimulus control method, and a storage medium.

Description of the Related Art

In recent years, user interfaces, which are employed in apparatuses such as a smartphone including a touch panel and a display screen, have become mainstream interfaces. For example, there is provided a user interface in which a display is scrolled in response to a flick of a screen, the scrolling speed is increased according to the flick speed and the number of flicks, and the scrolling speed is gradually decreased to eventually stop scrolling as though the scrolling is stopped with inertia when the flick is stopped. Japanese Unexamined Patent Application Publication (Translation of PCT Application) No. 2011-517810 discuses a technique that provides a user with a haptic effect according to the scrolling speed by use of vibration of a device. According to the technique, the device is vibrated at a speed corresponding to the scrolling speed. For example, the vibration is decreased as the scrolling speed increases.

Further, the user interfaces are generally configured to stop scrolling when the scrolled area is tapped by a finger while the scrolling is continued due to inertia.

However, conventionally, as the scrolling speed increases, it becomes difficult for the user to visually recognize the scrolling speed. Furthermore, according to the technique discussed in Japanese Unexamined Patent Application Publication (Translation of PCT Application) No. 2011-517810, the vibration decreases as the scrolling speed increases. Thus, the user cannot determine the scrolling speed when the scrolling speed is not lower than a certain speed. This causes a problem that in a case where the user taps a display screen to stop the scrolling while the display is scrolled at a high scrolling speed, the user cannot determine a position that is to be displayed as a result of the stop of the scrolling.

SUMMARY OF THE INVENTION

The present disclosure is directed to a technique capable of solving all or at least one of the problems described above.

According to an aspect of the present disclosure, a tactile stimulus control apparatus includes an intensity determination unit configured to determine, in a case where an operation performed by a manipulator on an input surface provided corresponding to a display unit is detected while an image is scroll-displayed by the display unit, an intensity of a tactile stimulus to be provided to the manipulator based on a scrolling speed at timing of detection of the operation, a tactile stimulus control unit configured to control a tactile stimulus generating unit, which is configured to generate the tactile stimulus to be provided to the manipulator, to generate the tactile stimulus with the intensity determined by the intensity determination unit, and a scrolling speed control unit configured to decrease a scrolling speed in a case where the operation performed by the manipulator on the input surface is detected while the image is scroll-displayed, wherein the intensity determination unit changes the intensity of the tactile stimulus according to a change in the scrolling speed controlled by the scrolling speed control unit.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

Figure 1:
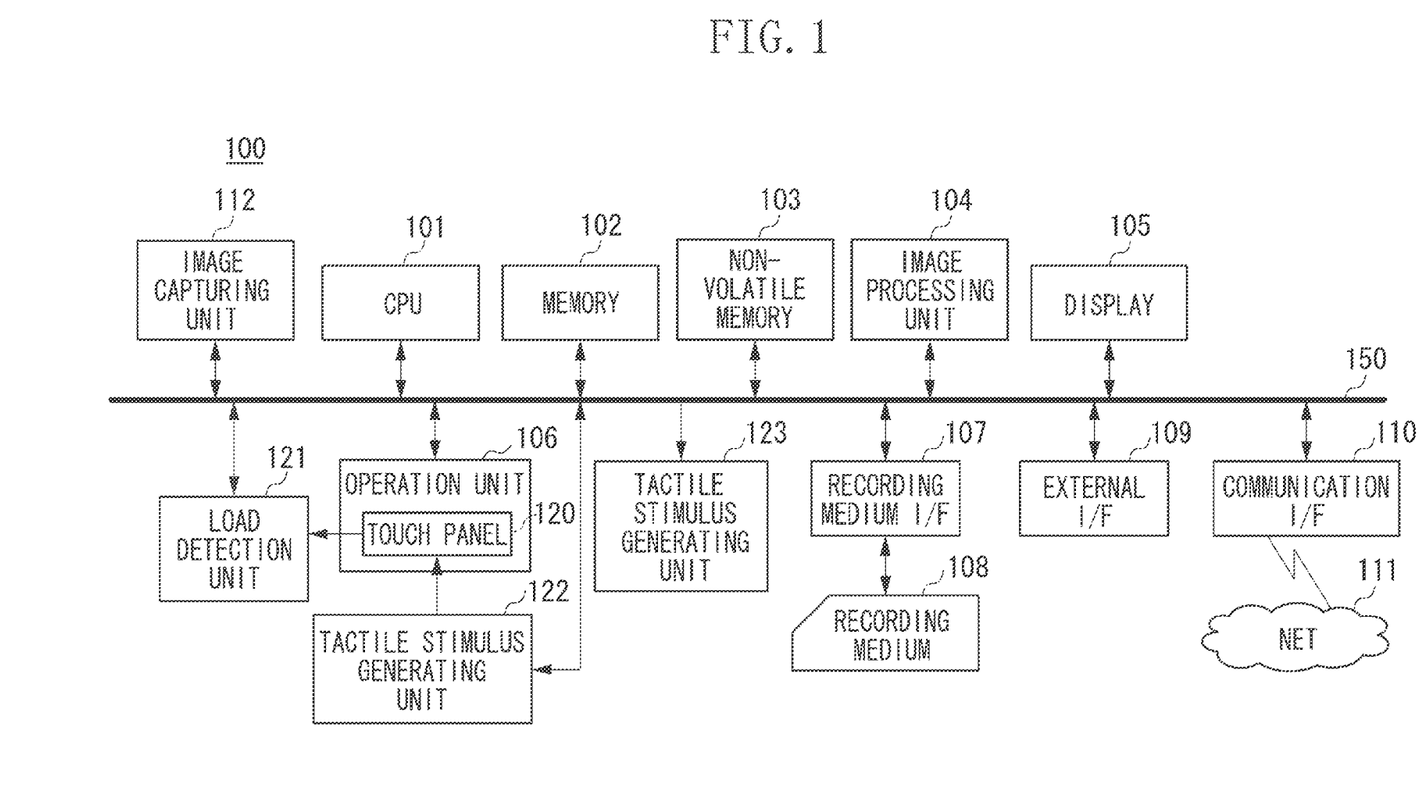
FIG. 1 is a block diagram illustrating a tactile stimulus control apparatus.

FIG. 1 illustrates an electronic device 100 as a tactile stimulus control apparatus according to a first exemplary embodiment. The electronic device 100 may be a mobile phone or the like. As illustrated in FIG. 1, a central processing unit (CPU) 101, a memory 102, a non-volatile memory 103, an image processing unit 104, a display 105, an operation unit 106, a recording medium interface (I/F) 107, an external I/F 109, and a communication I/F 110 are connected to an internal bus 150. Further, an image capturing unit 112, a load detection unit 121, and tactile stimulus generating units 122 and 123 are also connected to the internal bus 150. The components connected to the internal bus 150 can send and receive data to and from one another via the internal bus 150. As used herein, the term "unit" generally refers to any combination of software, firmware, hardware, or other component, such as circuitry, that is used to effectuate a purpose.

The memory 102 includes, for example, a random-access memory (RAM) (e.g., a volatile memory using a semiconductor device). The CPU 101 controls each component of the electronic device 100 according to, for example, a program stored in the non-volatile memory 103 by use of the memory 102 as a work memory. The non-volatile memory 103 stores image data, audio data, other data, various programs for the CPU 101 to operate, and the like. The non-volatile memory 103 includes, for example, a hard disk (HD) and a read-only memory (ROM).

The CPU 101 reads a program stored in the memory 102 or the non-volatile memory 103 and executes the program to realize functions and processing of the electronic device 100 which will be described below.

The image processing unit 104 performs various types of image processing on image data based on the control by the CPU 101. Examples of image data on which the image processing unit 104 performs image processing include image data stored in the non-volatile memory 103 or a recording medium 108, an image signal acquired via the external I/F 109, image data acquired via the communication I/F 110, and image data captured by the image capturing unit 112.

Examples of image processing to be performed by the image processing unit 104 include analog/digital (A/D) conversion processing, digital/analog (D/A) conversion processing, encoding processing of image data, compression processing, decoding processing, enlargement/reduction processing (resizing processing), noise reduction processing, and color conversion processing. The image processing unit 104 is, for example, a dedicated circuit block for performing a specific type of image processing. Further, depending on a type of image processing, the CPU 101 instead of the image processing unit 104 may execute the image processing according to a program.

The display 105 displays an image, a graphical user interface (GUI) screen constituting a graphical user interface and the like based on the control by the CPU 101. The CPU 101 controls each component of the electronic device 100 to generate display control signals according to a program, generate image signals to be displayed on the display 105, and output the image signals to the display 105. Then, the display 105 displays images based on the image signals.

As another example, the electronic device 100 may not include the display 105 but may include an interface for outputting image signals to be displayed on the display 105. In this case, the electronic device 100 displays images and the like on an external monitor (e.g., television set).

The operation unit 106 is an input device for receiving a user operation, including a text information input device such as a keyboard, a pointing device such as a mouse or a touch panel 120, buttons, a dial, a joystick, a touch sensor, and a touch pad. The touch panel 120 is an input device that is overlapped on the display 105 to be flat and outputs coordinate information corresponding to a touch position.

The recording medium 108 such as a memory card, a compact disk (CD), or a digital versatile disk (DVD) can be attached to the recording medium I/F 107. The recording medium I/F 107 reads or writes data from or to the attached recording medium 108 according to the control by the CPU 101.

The external I/F 109 is an interface for connecting to an external device via a wired cable or wirelessly to input/output image signals and/or audio signals. The communication I/F 110 is an interface for communication (including telephone communication) with an external device, Internet 111, or the like to send/receive various types of data such as files and commands.

The image capturing unit 112 is a camera unit including an image sensor such as a charge-coupled device (CCD) sensor and a complementary metal oxide semiconductor (CMOS) sensor, a zoom lens, a focus lens, a shutter, a diaphragm, a distance-measuring unit, and an A/D converter. The image capturing unit 112 can capture still images and moving images. Image data of images captured by the image capturing unit 112 is sent to the image processing unit 104, undergoes various types of processing performed by the image processing unit 104, and is then recorded as a still image file or a moving image file in the recording medium 108.

The CPU 101 receives via the internal bus 150 the coordinate information on the touch position that is output from the touch panel 120. Then, the CPU 101 detects an operation or state described below based on the coordinate information.

(a) An operation of touching the touch panel 120 with a finger or pen (hereinafter referred to as "touch-down").
(b) A state of touching the touch panel 120 with a finger or pen (hereinafter referred to as "touch-on").
(c) An operation of moving a finger or pen on the touch panel 120 while keeping the finger or pen touching the touch panel 120 (hereinafter referred to as "move").
(d) An operation of releasing a finger or pen touching the touch panel 120 (hereinafter referred to as "touch-up").
(e) A state in which nothing is touching the touch panel 120 (hereinafter referred to as "touch-off").

In a case where the CPU 101 detects a move, the CPU 101 also determines a moving direction of the finger or pen based on a change in the coordinates of the touch position. More specifically, the CPU 101 determines vertical and horizontal components of the moving direction on the touch panel 120.

The CPU 101 is also configured to detect a stroke operation, a flick operation, and a drag operation. In a case where the user performs a touch-down operation followed by a certain amount of a move operation and then a touch-up operation, the CPU 101 detects a stroke. Further, in a case where a move operation of a predetermined distance or longer at a predetermined speed or higher is detected followed by detection of a touch-up operation, the CPU 101 detects a flick. Further, in a case where a move operation of the predetermined distance or longer at a speed that is lower than the predetermined speed is detected, the CPU 101 detects a drag.

The flick is an operation of quickly moving a finger for a predetermined distance while keeping the finger touching the touch panel 120 and then releasing the finger from the touch panel 120. More specifically, the flick is an operation of quickly sliding a finger and filliping the touch panel 120.

The touch panel 120 may be a touch panel of any type such as a resistive touch panel, a capacitive touch panel, a touch panel using a surface acoustic wave technique, an infrared touch panel, a touch panel using an electromagnetic induction technique, a touch panel using an image recognition technique, and a touch panel using an optical sensor.

The load detection unit 121 is integrated with the touch panel 120 by bonding or the like. The load detection unit 121 is a distortion gauge sensor and detects the load (pressure) applied to the touch panel 120 by use of the phenomenon that the touch panel 120 is deflected (distorted) by an infinitesimal amount corresponding to the pressing force of the touch operation. As another example, the load detection unit 121 may be integrated with the display 105. In this case, the load detection unit 121 detects the load applied to the touch panel 120 via the display 105.

The tactile stimulus generating unit 122 generates a tactile stimulus to be provided to a manipulator such as a finger or pen with which the user operates the touch panel 120. More specifically, the tactile stimulus generating unit 122 provides via a touched portion stimulation that is detectable by the user performing the touch operation. The tactile stimulus generating unit 122 is integrated with the touch panel 120 by bonding or the like. The tactile stimulus generating unit 122 is a piezoelectric element, more specifically a piezoelectric vibrator. The tactile stimulus generating unit 122 vibrates at arbitrary amplitudes and frequencies under the control by the CPU 101. In this way, the touch panel 120 is bent and vibrated, and the vibration of the touch panel 120 is transmitted as a tactile stimulus to the manipulator. More specifically, the tactile stimulus generating unit 122 vibrates to provide a tactile stimulus to the manipulator.

As another example, the tactile stimulus generating unit 122 may be integrated with the display 105. In this case, the tactile stimulus generating unit 122 bends and vibrates the touch panel 120 via the display 105.

The CPU 101 changes the amplitude and frequency of the tactile stimulus generating unit 122 and vibrates the tactile stimulus generating unit 122 in various patterns to generate various patterns of tactile stimuli.

Further, the CPU 101 can control the tactile stimulus based on the touch position detected on the touch panel 120 and the pressing force detected by the load detection unit 121. For example, in a case where the CPU 101 detects a touch position corresponding to a button icon displayed on the display 105, and the load detection unit 121 detects a pressing force that is not smaller than a predetermined value in response to a touch operation performed by the manipulator, the CPU 101 generates about a period of vibration. In this way, the user can feel the tactile stimulus similar to a sense of a click at the time of pressing a mechanical button.

Further, the CPU 101 executes a function of a button icon only if the CPU 101 detects a pressing force that is not smaller than a predetermined value while detecting a touch on the position of the button icon. In other words, the CPU 101 does not execute the function of the button icon if the CPU 101 detects a weak pressing force in such a case as the user merely touches the button icon. In this way, the user can perform operations while feeling like pressing a mechanical button.

The load detection unit 121 is not limited to the distortion gauge sensors. As another example, the load detection unit 121 may include a piezoelectric element. In this case, the load detection unit 121 detects the load based on a voltage corresponding to the pressing force that is output from the piezoelectric element. Furthermore, the piezoelectric element serving as the load detection unit 121 in this case may be in common with the piezoelectric element serving as the tactile stimulus generating unit 122.

Further, the tactile stimulus generating unit 122 is not limited to those that generate vibrations with a piezoelectric element. As another example, the tactile stimulus generating unit 122 may be a tactile stimulus generating unit that generates an electric stimulus. For example, the tactile stimulus generating unit 122 may include a conductive panel and an insulating panel. The conductive panel and the insulating panel are overlapped to be flat on the display 105 as in the touch panel 120. When the user touches the insulating panel, the conductive panel is positively charged. More specifically, the tactile stimulus generating unit 122 positively charges the conductive panel to generate a tactile stimulus as an electric stimulus. Further, the tactile stimulus generating unit 122 may be configured to provide the user with a sense (tactile stimulus) that the skin is pulled by the Coulomb's force.

As another example, the tactile stimulus generating unit 122 may include a conductive panel, and for each position of the conductive panel, whether to positively charge the part corresponding to each position can be selected. In this case, the CPU 101 controls the charging position of the positive charge. In this way, the tactile stimulus generating unit 122 can provide the user with a variety of tactile stimuli such as "cragginess," "roughness," and "smoothness."

As another example, the tactile stimulus generating unit 122 may generate a tactile stimulus by ultrasonically vibrating a surface of the touch panel 120. A high-pressure air layer is formed between the touch panel 120 and the finger, due to the ultrasonic vibration. The tactile stimulus generating unit 122 may provide "slickness" by use of the floating action of the air layer or "roughness" by instantly switching the magnitude of the floating action.

The tactile stimulus generating unit 123 vibrates the entire electronic device 100 to generate a tactile stimulus. The tactile stimulus generating unit 123 includes an eccentric motor, for example, and realizes the publicly-known vibration function. In this way, the electronic device 100 can provide a tactile stimulus to the hand of the user holding the electronic device 100 through the vibrations generated by the tactile stimulus generating unit 123.

Figure 2:
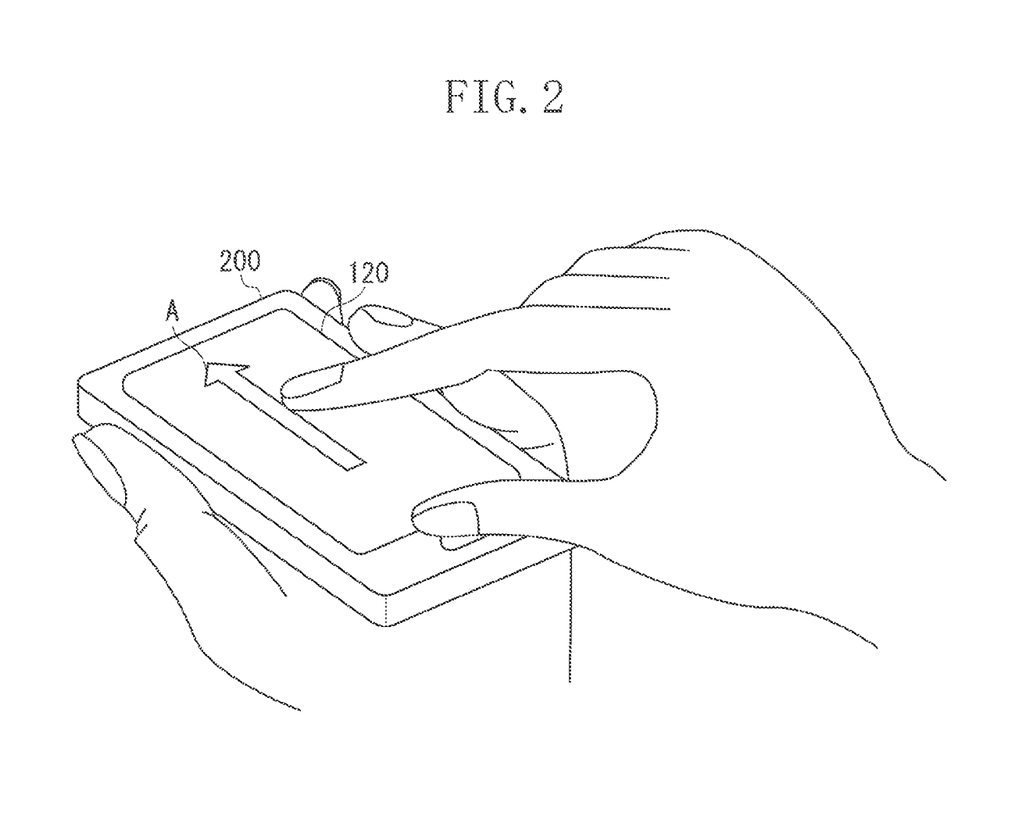
FIG. 2 illustrates a flick operation.

FIG. 2 illustrates a flick operation. The user holds a main body 200 of the electronic device 100 with the user's left hand and performs an input operation with the user's right forefinger. A user operation of tracing the touch panel 120 at a predetermined speed or higher for a predetermined distance or longer in the direction of an arrow A indicated in FIG. 2 and then releasing the finger, i.e., a moving operation on an input surface, is referred to as a flick operation. When the flick operation is performed, the CPU 101 controls the screen drawing as if texts and images displayed on the display 105 are fillipped and scrolled. Hereinafter, such a screen display will be referred to as "scrolling display." At this time, the CPU 101 controls the scrolling speed according to the flick speed. More specifically, the CPU 101 increases the scrolling speed in a case where a quick flick operation is performed. On the other hand, the CPU 101 decreases the scrolling speed in a case where a slow flick operation is performed.

When the user stops the flick operation and releases the user's right hand from the touch panel 120, the CPU 101 controls the screen drawing to gradually decrease the scrolling speed as if the displayed screen is scrolled due to inertia. Hereinafter, the state in which the scrolling speed is gradually decreased in this way will be referred to as "inertial scrolling state." As described above, the CPU 101 starts scroll-displaying an image based on the flick operation performed on the touch panel 120, and as the time passes after the flick operation (after the moving operation), the CPU 101 gradually decreases the scrolling speed (scrolling control processing).

Although the present exemplary embodiment is described using an example in which the inertial scrolling state is realized when the flick operation is stopped, this is not a limiting example. As another example, the CPU 101 may continue scrolling the screen at a constant speed in the case where the flick operation is stopped.

As the scrolling speed increases, the user becomes unable to visually recognize a rough scrolling speed. Here, the state in which the user can determine the scrolling speed indicates that the user can visually determine the scrolling speed to such a degree that the user can perform a tap operation to stop at a desired position a displayed screen scrolled at an arbitrary position.

Further, while the screen is scrolled, the tactile stimulus generating unit 123 applies vibrations to the entire electronic device 100 according to the scrolling speed. More specifically, the tactile stimulus generating unit 123 applies stronger vibrations as the scrolling speed decreases. On the other hand, the tactile stimulus generating unit 123 applies weaker vibration as the scrolling speed increases. In this way, the left hand of the user can feel a tactile stimulus with an intensity corresponding to the scrolling speed.

Figure 3:
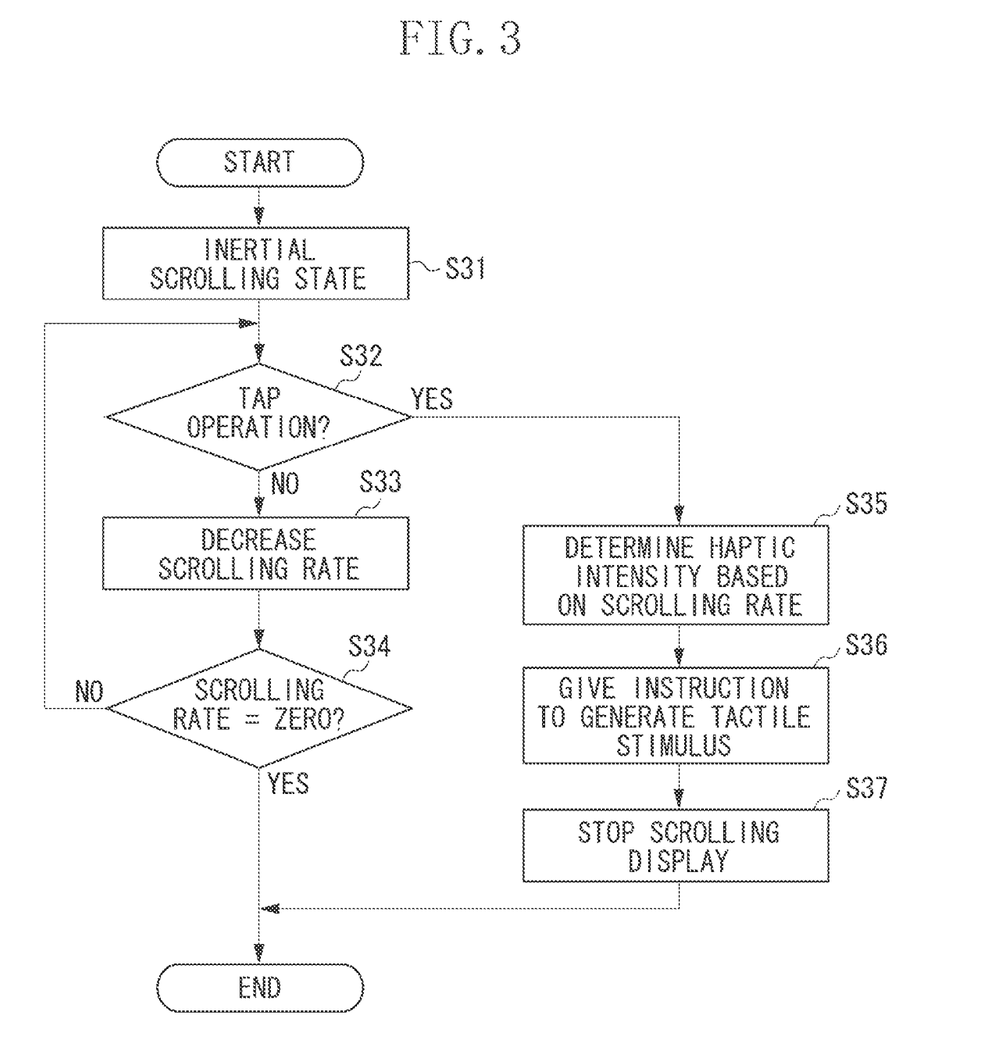
FIG. 3 is a flow chart illustrating display control processing according to a first exemplary embodiment.

FIG. 3 is a flow chart illustrating display control processing performed by the electronic device 100. In step S31, the CPU 101 controls the image drawing performed on the display 105 to realize the inertial scrolling state. The processing in step S31 is an example of the display processing for scroll-displaying an image while gradually decreasing the scrolling speed. Next, in step S32, the CPU 101 determines whether a tap operation (touch-down operation) is performed on the touch panel 120. The tap operation corresponds to an instruction to stop scrolling. More specifically, the CPU 101 receives the instruction to stop scrolling in the case where a tap operation is detected. If the CPU 101 detects no tap operation (NO in step S32), the processing proceeds to step S33. On the other hand, if the CPU 101 detects a tap operation (YES in step S32), the processing proceeds to step S35.

In step S33, the CPU 101 decreases the scrolling speed in the inertial scrolling state. In step S34, the CPU 101 determines whether the scrolling speed is zero. If the scrolling speed becomes zero (YES in step S34), the CPU 101 ends the display control processing. On the other hand, if the scrolling speed is not zero (NO in step S34), the processing returns to step S32. In other words, in steps S32 to S34, the CPU 101 gradually decreases the scrolling speed to realize the inertial scrolling state.

In step S35, the CPU 101 determines the intensity of a tactile stimulus to be generated by the tactile stimulus generating unit 122 based on the scrolling speed at the detection timing at which the tap operation is detected (intensity determination processing). More specifically, the CPU 101 determines the intensity to be higher at a higher scrolling speed. In this way, a feedback that matches the feeling of stopping a moving object with a finger can be provided to the finger serving as a manipulator.

Next, in step S36, the CPU 101 instructs the tactile stimulus generating unit 122 to generate a tactile stimulus with the determined intensity. In response to the instruction, the tactile stimulus generating unit 122 generates a tactile stimulus with the intensity determined by the CPU 101. The processing in step S36 is an example of the tactile stimulus control processing for controlling the tactile stimulus generating unit 122 to generate a tactile stimulus with a determined intensity. Next, in step S37, the CPU 101 stops scroll-displaying according to the stop instruction and displays a still image.

As described above, the electronic device 100 according to the present exemplary embodiment controls the haptic intensity given at a tap on the touch panel 120 according to the scrolling speed at the time of the tap. Thus, even when the scrolling speed is so high that the user cannot visually determine the scrolling speed, the user can recognize a rough scrolling speed from the haptic intensity of the tap on the touch panel 120. More specifically, in a case where a tap operation is performed during the scroll-displaying, the electronic device 100 allows the user to recognize a rough scrolling speed.

As a first modification example of the electronic device 100 according to the present exemplary embodiment, the touch panel 120 may be arranged at a position apart from the display 105. In this case, positions on the touch panel 120 are also respectively associated with positions on the display 105, and the CPU 101, in response to a touch input at each position on the touch panel 120, can receive an instruction input at a corresponding position on the display 105.

As a second modification example, the electronic device 100 may perform the scroll-displaying at a constant scrolling speed instead of the inertial scrolling state. In this case, the electronic device 100 also determines the haptic intensity based on the scrolling speed and generates a tactile stimulus with the determined haptic intensity.

According to a second exemplary embodiment, an electronic device 100 does not instantly stop scrolling in response to a tap operation, but gradually decreases the scrolling speed while the touch-on state has continued following the tap, and the electronic device 100 eventually stops scrolling.

Figure 4:
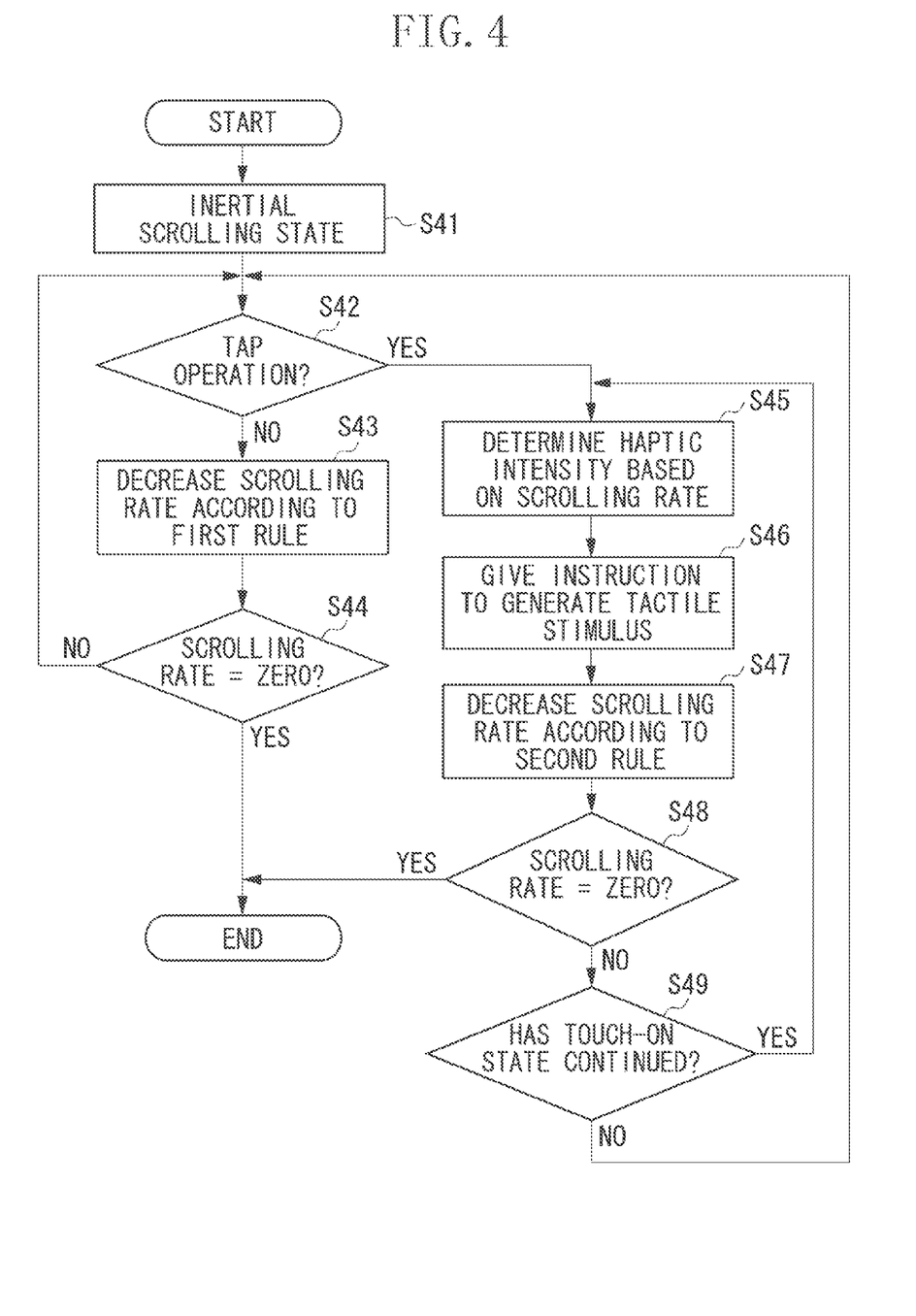
FIG. 4 is a flow chart illustrating display control processing according to a second exemplary embodiment.

FIG. 4 is a flow chart illustrating display control processing performed by the electronic device 100 according to the present exemplary embodiment. In step S41, the CPU 101 controls the image drawing performed on the display 105 to realize the inertial scrolling state. The processing in step S41 is an example of the display processing for scroll-displaying an image. Next, in step S42, the CPU 101 determines whether a tap operation (touch-down operation) is performed on the touch panel 120. If the CPU 101 detects no tap operation (NO in step S42), the processing proceeds to step S43. On the other hand, if the CPU 101 detects a tap operation (YES in step S42), the processing proceeds to step S45.

In step S43, the CPU 101 decreases the scrolling speed in the inertial scrolling state. More specifically, a first rule defining the speed at which the scrolling speed decreases to realize the inertial scrolling state is stored in, for example, the non-volatile memory 103, and the CPU 101 decreases the scrolling speed according to the first rule. The processing in step S43 is an example of the scrolling speed control processing.

Next, in step S44, the CPU 101 determines whether the scrolling speed is zero. If the scrolling speed becomes zero (YES in step S44), the CPU 101 ends the display control processing. On the other hand, if the scrolling speed is not zero (NO in step S44), the processing returns to step S42.

In step S45, the CPU 101 determines the intensity of a tactile stimulus to be generated by the tactile stimulus generating unit 122 based on the scrolling speed at the detection timing at which the tap operation is detected. More specifically, the CPU 101 determines the intensity to be higher at a higher scrolling speed. Next, in step S46, the CPU 101 instructs the tactile stimulus generating unit 122 to generate a tactile stimulus with the determined haptic intensity. In response to the instruction, the tactile stimulus generating unit 122 generates a tactile stimulus with the intensity determined by the CPU 101.

Next, in step S47, the CPU 101 decreases the scrolling speed according to a second rule. The second rule is information defining a speed of decreasing the scrolling speed more significantly than the first rule. The second rule is stored in the non-volatile memory 103 or the like. Next, in step S48, the CPU 101 determines whether the scrolling speed is zero. If the scrolling speed becomes zero (YES in step S48), the CPU 101 ends the display control processing. On the other hand, if the scrolling speed is not zero (NO in step S48), the processing proceeds to step S49.

In step S49, the CPU 101 determines whether a touch-on state has continued following the tap operation (touch-down operation) detected in step S42 has continued. If the touch-on state has continued (YES in step S49), the processing returns to step S45. More specifically, in this case, the CPU 101 repeats the loop processing of steps S45 to S49.

In this way, while the touch-on state has continued, the scrolling speed gradually decreases, and thus the generated haptic intensity also gradually decreases. Accordingly, the user can roughly recognize a change in the scrolling speed from a change in the haptic intensity.

In steps S45 to S49, the CPU 101 controls the tactile stimulus generating unit 122 to change the haptic intensity according to a decrease (change) in the scrolling speed according to the second rule. More specifically, the processing in steps S45 to S49 is an example of the tactile stimulus control processing for controlling the intensity of a tactile stimulus to be provided to the manipulator by the tactile stimulus generating unit 122 in such a manner that the intensity is changed according to a change in the scrolling speed. Further, the processing in step S47 is an example of the scrolling speed control processing. The configuration and processing of the electronic device 100 according to the present exemplary embodiment other than those described above are similar to those according to the first exemplary embodiment.

As described above, while the touch-on state has continued following the tap, the electronic device 100 according to the present exemplary embodiment gradually decreases the scrolling speed and also gradually decreases the haptic intensity. Accordingly, the user can roughly recognize a decrease in the scrolling speed from the haptic intensity.

Described below is a modification example of the electronic device 100 according to the present exemplary embodiment. The electronic device 100 may perform the scroll-displaying at a constant scrolling speed instead of the inertial scrolling state. In this case, the electronic device 100 gradually decreases the scrolling speed in the case where a tap operation is received during the scrolling state in which scroll-displaying is performed at a constant speed. Then, the electronic device 100 generates a tactile stimulus in response to a stop instruction corresponding to the tap operation and, while the tap has continued, gradually decreases the intensity of the tactile stimulus according to a decrease in the scrolling speed.

An electronic device 100 according to a third exemplary embodiment discriminates between "a touch to stop" and "a touch to increase the speed" from an input operation performed on the touch panel 120 during the inertial scrolling state. More specifically, in a case where a tap operation without a change in the touch position is detected, the electronic device 100 determines the operation as "a touch to stop" and stops scrolling or decreases the scrolling speed in response to the touch operation as described in the first or second exemplary embodiment.

On the other hand, in a case where a flick operation with a change in the touch position on the touch panel 120 is detected, the electronic device 100 determines the operation as "a touch to increase the speed." Then, in a case where the flick operation is performed, the CPU 101 of the electronic device 100 performs the following processing to identify a moving direction of the touch position in the flick operation, i.e., an operation direction in the flick operation.

Then, the CPU 101 determines whether the operation direction belongs to a first or second direction range. Here, the first direction range is a 180° angular width range centered on the scrolling direction, which is an advancing direction of the scroll display, and the second direction range is a direction range other than the first direction range. The first and second direction ranges only need to be directions defined using as a reference the scrolling direction and the direction that is opposite to the scrolling direction, and specific ranges are not limited to those specified in the present exemplary embodiment. As another example, the first direction range may be a 90° angular width range centered on the scrolling direction, and the second direction range may be a 90° angular width range centered on a direction that is opposite to the scrolling direction.

Assume that the operation direction belongs to the first direction range, i.e., the operation direction is the same direction as the scrolling direction. In this case, the CPU 101 assumes that the moving speed (hereinafter referred to as "operation speed") of the manipulator in the flick operation and the scrolling speed have the same plus/minus sign. More specifically, the CPU 101 determines a total value of the operation speed and the scrolling speed as a new scrolling speed. In other words, in the case where the operation direction of the flick operation belongs to the first direction range, the CPU 101 increases the scrolling speed (scrolling control processing).

Further, assume that the moving direction of the touch position in the flick operation belongs to the second direction range, i.e., the moving direction is opposite to the scrolling direction. In this case, the CPU 101 assumes that the operation speed of the flick operation and the scrolling speed have different plus/minus signs. More specifically, a negative speed is a scrolling speed of advancing in a direction that is opposite to a positive speed. Thus, the CPU 101 calculates a difference between the absolute value of the operation speed and the absolute value of the scrolling speed. Then, the CPU 101 decreases the scrolling speed based on the difference in a case where the absolute value of the operation speed is smaller than the absolute value of the scrolling speed. On the other hand, the CPU 101 changes the scrolling direction to the opposite direction in the case where the absolute value of the operation speed is larger than the absolute value of the scrolling speed. Furthermore, in this case, the CPU 101 determines the scrolling speed in the opposite direction based on the difference between the absolute value of the operation speed and the absolute value of the scrolling speed.

Further, the CPU 101 determines the haptic intensity based on the absolute value of the difference between the operation speed of the flick operation and the scrolling speed (intensity determination processing). Then, the CPU 101 instructs the tactile stimulus generating unit 122 to generate a tactile stimulus with the determined intensity (tactile stimulus control processing).

In the case where the operation direction of the flick operation belongs to the second direction range, the CPU 101 calculates the absolute value of a difference between the operation speed of the flick operation and the scrolling speed based on the assumption that the operation speed and the scrolling speed have different plus/minus signs. In this way, a tactile stimulus with a higher haptic intensity is generated in the case where the direction of the flick operation is opposite to the scrolling direction than the case where the direction of the flick operation is the same as the scrolling direction. The configuration and processing of the electronic device 100 according to the present exemplary embodiment other than those described above are similar to those according to the first or second exemplary embodiment.

As described above, the electronic device 100 according to the present exemplary embodiment can generate a tactile stimulus that matches the user's feeling based on the scrolling speed and the scrolling direction of the scroll display and the direction of the flick operation in response to the flick operation performed during the scroll-displaying. In this way, the user can recognize an effect of the flick operation performed by the user on the scrolling from a change in the haptic intensity.

As a first modification example of the electronic device 100 of the present exemplary embodiment, the CPU 101 may perform the scroll-displaying at a constant scrolling speed instead of the inertial scrolling state. In this case, the electronic device 100 controls the tactile stimulus based on the direction of the flick operation, the scrolling speed, and the scrolling direction.

Further, as a second modification example, the CPU 101 may determine the haptic intensity based on the relationship between the direction of the flick operation and the scrolling direction without taking into consideration the scrolling speed. For example, the CPU 101 may determine a first haptic intensity in the case where the direction of the flick operation belongs to the first direction range. On the other hand, the CPU 101 may determine a second haptic intensity, which is higher than the first haptic intensity, in the case where the direction of the flick operation belongs to the second direction range.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-075748 filed Apr. 1, 2014, which is hereby incorporated by reference herein in its entirety.

What is claimed is:

1. A tactile stimulus control apparatus comprising:
   one or more processors that, when executing instructions, causes the apparatus to:
   control, in a case where a moving operation performed by a manipulator on an input surface provided corresponding to a display unit is detected while an image is displayed by the display unit, a scrolling speed based on the moving operation;
   determine an intensity of a tactile stimulus to be provided to the manipulator based on a scrolling speed in a scroll-displaying according to the moving operation; and
   control to generate the tactile stimulus to be provided to the manipulator to generate the tactile stimulus with the determined intensity,
   wherein in a case where another moving operation on the input surface is detected during the scroll-displaying according to the moving operation, the intensity is determined based on a difference between an operation speed of the other moving operation and the scrolling speed of the scroll-displaying according to the moving operation.

2. The tactile stimulus control apparatus according to claim 1, wherein in a case where a direction of the moving operation belongs to a first direction range including a scrolling direction, the scrolling speed increases.

3. The tactile stimulus control apparatus according to claim 1, wherein in a case where a direction of the moving operation belongs to a second direction range including a direction that is opposite to a scrolling direction and an absolute value of the operation speed of the moving operation is smaller than an absolute value of the scrolling speed, the scrolling speed decreases.

4. The tactile stimulus control apparatus according to claim 3, wherein in a case where a direction of the moving operation belongs to the second direction range and the absolute value of the operation speed of the moving operation is larger than the absolute value of the scrolling speed, the scrolling direction changes to an opposite direction.

5. The tactile stimulus control apparatus according to claim 1, wherein the apparatus starts scroll-displaying the image based on the moving operation performed by the manipulator on the input surface and gradually decreases the scrolling speed of the scroll-displaying over time after the moving operation.

6. A tactile stimulus control method to be executed by a tactile stimulus control apparatus, the method comprising:
   controlling, in a case where a moving operation performed by a manipulator on an input surface provided corresponding to a display unit is detected while an image is scroll-displayed by the display unit, a scrolling speed based on the moving operation;
   determining an intensity of a tactile stimulus to be provided to the manipulator based on a scrolling speed in a scroll-displaying according to the moving operation; and
   controlling to generate the tactile stimulus to be provided to the manipulator to generate the tactile stimulus with the determined intensity,
   wherein in a case where another moving operation on the input surface is detected during the scroll-displaying according to the moving operation, the intensity is determined based on a difference between an operation speed of the other moving operation and the scrolling speed of the scroll-displaying according to the moving operation.

7. A storage medium storing a program to be read and executed by a computer to execute a tactile stimulus control method comprising:
   controlling, in a case where a moving operation performed by a manipulator on an input surface provided corresponding to a display unit is detected while an image is scroll-displayed by the display unit, a scrolling speed based on the moving operation;
   determining an intensity of a tactile stimulus to be provided to the manipulator based on a scrolling speed in a scroll-displaying according to the moving operation; and
   controlling to generate the tactile stimulus to be provided to the manipulator to generate the tactile stimulus with the determined intensity,
   wherein in a case where another moving operation on the input surface is detected during the scroll-displaying according to the moving operation, the intensity is determined based a difference between an operation speed of the other moving operation and the scrolling speed of the scroll-displaying according to the moving operation.

8. A tactile stimulus control apparatus comprising:
a display that displays an image;
one or more processors that, when executing instructions, causes the apparatus to:
generate a tactile stimulus in a case where an operation performed using a manipulator on an input surface provided corresponding to the display is detected; and
control scrolling of the image displayed on the display in accordance with the operation performed using the manipulator on the input surface, and continue scrolling even if there is no operation on the input surface after a predetermined operation,
wherein, in a case where a first operation performed using the manipulator on the input surface, to change a scrolling speed is detected during continuation of the scrolling, the apparatus generates a tactile stimulus that has an intensity corresponding, not to a scrolling speed reflecting the change by the first operation, but to a speed of the scrolling being performed at timing of detection of the first operation.

9. The tactile stimulus control apparatus according to claim 8, wherein the predetermined operation is flick operation on the input surface.

10. The tactile stimulus control apparatus according to claim 8, wherein the predetermined speed is decreased over time or is kept at a constant speed.

11. The tactile stimulus control apparatus according to claim 8,
wherein the first operation is a tap operation or a touchdown operation on the input surface.

12. A tactile stimulus control method to be executed by a tactile stimulus control apparatus, the method comprising:
displaying an image;
generating a tactile stimulus in a case where an operation performed using a manipulator on an input surface provided corresponding to the display is detected; and
control scrolling of the image displayed on the display in accordance with the operation performed using the manipulator on the input surface, and continue scrolling even if there is no operation on the input surface after a predetermined operation,
wherein, in a case where a first operation performed using the manipulator on the input surface, to change a scrolling speed is detected during continuation of the scrolling, the tactile stimulus is generated having an intensity corresponding, not to a scrolling speed reflecting the change by the first operation, but to a speed of the scrolling being performed at timing of detection of the first operation.

\* \* \* \* \*